T. D. WALKER.
BELT BUCKLE.
APPLICATION FILED APR. 29, 1921.
1,388,623.
Patented Aug. 23, 1921.
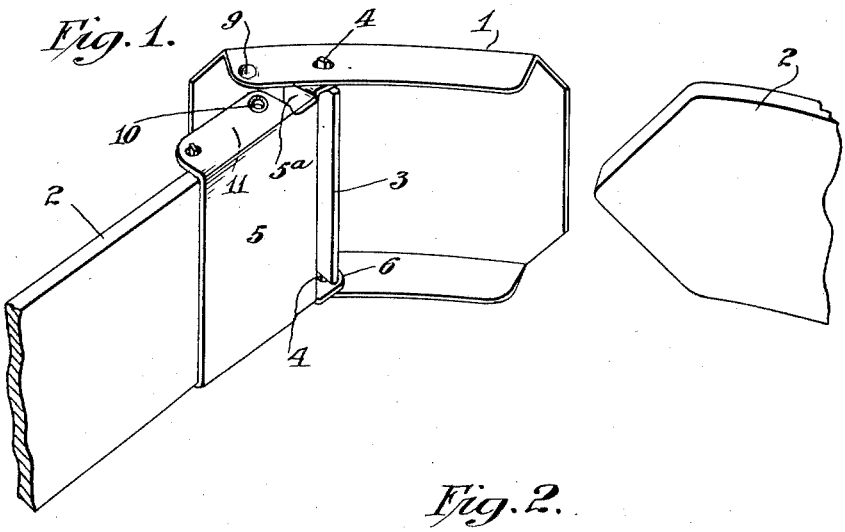
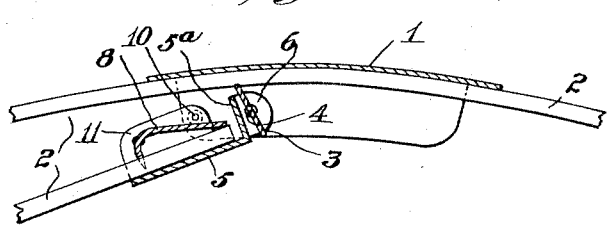
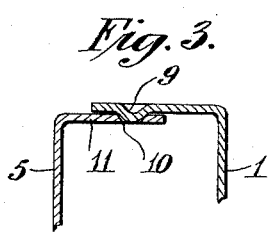
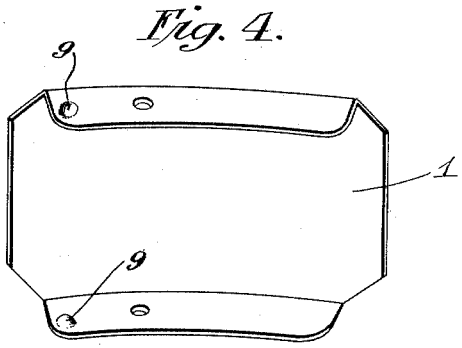
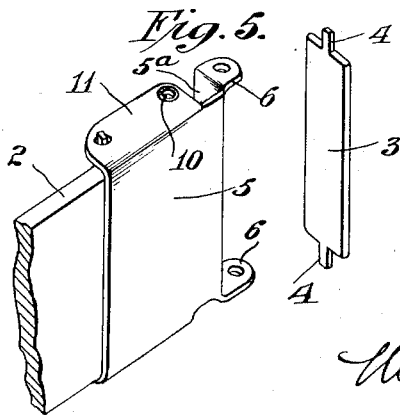
INVENTOR
Thomas D Walker
BY
ATTORNEYS

UNITED STATES PATENT OFFICE.

THOMAS D. WALKER, OF NEW BRITAIN, CONNECTICUT, ASSIGNOR TO THE TRAUT & HINE MFG. COMPANY, OF NEW BRITAIN, CONNECTICUT, A CORPORATION OF CONNECTICUT.

BELT-BUCKLE.

1,388,623.     Specification of Letters Patent.     Patented Aug. 23, 1921.

Application filed April 29, 1921. Serial No. 465,421.

*To all whom it may concern:*

Be it known that I, THOMAS D. WALKER, a citizen of the United States of America, residing at New Britain, Connecticut, have invented a new and useful Belt-Buckle, of which the following is a specification.

My invention relates to improvements in belt buckles and has for its object the provision of a construction which will not only effectively grip the belt, but will adapt itself to belts of varying thicknesses. The construction is also such as to prevent undue chafing or wear on the belt.

In the accompanying drawing:

Figure 1 is a perspective view of the buckle, open.

Fig. 2 is a longitudinal section of the buckle, closed.

Fig. 3 is a section showing a detail.

Fig. 4 is a perspective view of the main frame.

Fig. 5 is a perspective view of the two parts of the belt gripping means.

1 represents the main body of the belt buckle which is rearwardly flanged so as to provide a longitudinal channel at its rear side, through which channel the free end of the belt passes. 2 represents the belt. 3 represents a belt gripping plate which is provided with pivot ends 4—4 intermediate the length of each end. These pivot ends project through holes in the rear flanges of the body. 5 represents a lever which has two ears 6—6 at each end which are perforated and through which the pivot ends of the gripping plate pass so that said lever 5 will be supported on said pivot ends. The lever is provided with a bearing wall 5ª at its inner end between the ears 6—6, which bearing wall may strike against the body of the gripping plate 3 to positively tilt it. The arrangement is such that there is a limited amount of lost motion between the wall 5ª and the gripping plate 3. 8 is a clamp for securing the fixed end of the belt to the lever 5, this affording one convenient means for such attachment. 9—9 are detents on the inner walls of the flanges at the back of the body which tend to take into corresponding recesses or holes 10—10 in the flanges 11—11 on the lever 5. These detents operate to frictionally hold the lever 5 in the belt gripping position. When the lever 5 is swung back, the lower edge of the wall 5ª engages the lower edge of the gripping plate 3 and swings it into a position to free the adjustable end of the belt which may then be withdrawn or tightened as desired. When the lever 5 is swung in the opposite direction, the upper edge of the wall 5ª will engage the upper part of the gripping plate 3 and tilt it in a direction to grip the belt. If the belt is relatively thin, the lost motion between the gripping plate 3 and the wall 5ª permits the former to swing still further on its own pivotal bearings to properly grip said thinner belt. By this means the buckle is self adapted to belts of different thicknesses.

What I claim is:

1. A belt buckle comprising a body portion having rearwardly extending flanges forming a channel between them at the back of said body, a tilting gripping plate pivoted at its ends and intermediate its upper and lower edges to said flanges, a swinging lever pivoted adjacent to the gripping plate at the back of the body and coöperating therewith, and having a limited amount of lost motion relatively thereto and adapted when swung to move said gripping plate into or out of the belt gripping position by engaging portions thereof on opposite sides of its pivotal axis.

2. A belt buckle comprising a body portion having rearwardly extending flanges forming a channel between them at the back of said body, a tilting gripping plate pivoted at its ends and intermediate its upper and lower edges to said flanges, a swinging lever pivoted adjacent to the gripping plate at the back of the body and coöperating therewith, and having a limited amount of lost motion relatively thereto and adapted when swung to move said gripping plate into or out of the belt gripping position, and a friction fastening for holding the lever in the belt engaging position by engaging portions thereof on opposite sides of its pivotal axis.

THOMAS D. WALKER.